United States Patent
Esser et al.

(10) Patent No.: US 7,040,851 B2
(45) Date of Patent: May 9, 2006

(54) FASTENING ELEMENT

(75) Inventors: Jens-Jörg Esser, Hohenems (AT);
Reimund Schlosser, Feldkirch (AT);
Dietmar Binder, Feldkirch (AT);
Markus Durig, Feldkirch (AT);
Alexander Kindle, Schaan (LI)

(73) Assignee: Hilti Aktiengesellschaft, Schann (LI)

( * ) Notice: Subject to any disclaimer, the term of this patent is extended or adjusted under 35 U.S.C. 154(b) by 19 days.

(21) Appl. No.: 10/127,262

(22) Filed: Apr. 22, 2002

(65) Prior Publication Data

US 2002/0154968 A1 Oct. 24, 2002

(30) Foreign Application Priority Data

Apr. 23, 2001 (DE) ................. 101 19 800

(51) Int. Cl.
*F16B 15/00* (2006.01)

(52) U.S. Cl. .................. 411/451.1; 411/451.3; 411/490; 411/498

(58) Field of Classification Search ........... 411/440, 411/441, 480, 484, 487, 490, 492, 498, 451.1, 411/452, 453, 455, 456, 451.3, 493–497, 411/499
See application file for complete search history.

(56) References Cited

U.S. PATENT DOCUMENTS

| | | | |
|---|---|---|---|
| 1,697,810 A | 1/1929 | Comstock | |
| 1,876,021 A * | 9/1932 | Quigley | 29/271 |
| 2,201,087 A * | 5/1940 | Hallowell | 411/168 |
| 2,212,787 A | 8/1940 | Miller | |
| 2,223,871 A * | 12/1940 | Johnson | 411/453 |
| 2,649,009 A * | 8/1953 | Selby | 411/453 |
| 2,819,641 A * | 1/1958 | Corckran | 411/456 |
| 3,276,820 A * | 10/1966 | Ditson | 299/100 |
| 3,501,994 A * | 3/1970 | Biermann et al. | 411/446 |
| 3,505,919 A * | 4/1970 | Thurner et al. | 411/440 |
| 3,555,957 A * | 1/1971 | Hermle | 411/440 |
| 3,618,445 A * | 11/1971 | Hartmann et al. | 411/441 |
| 3,921,495 A | 11/1975 | Braun | |
| 4,718,802 A * | 1/1988 | Rockenfeller et al. | 411/421 |
| 4,915,561 A * | 4/1990 | Buhri et al. | 411/439 |
| 5,127,785 A | 7/1992 | Faucher | |
| 5,261,770 A | 11/1993 | Hoepker | |
| 5,658,109 A * | 8/1997 | Van Allman et al. | 411/440 |
| 6,171,042 B1 * | 1/2001 | Olvera et al. | 411/441 |
| 6,851,906 B1 * | 2/2005 | Gassmann et al. | 411/440 |
| 2002/0154968 A1 * | 10/2002 | Esser et al. | 411/487 |
| 2002/0187018 A1 * | 12/2002 | Gassmann et al. | 411/439 |

FOREIGN PATENT DOCUMENTS

| | | |
|---|---|---|
| DE | 1019869 | 11/1957 |
| DE | 1181139 | 5/1964 |

* cited by examiner

*Primary Examiner*—William L. Miller
(74) *Attorney, Agent, or Firm*—Abelman, Frayne & Schwab

(57) ABSTRACT

A nail-shaped fastening element including a first, conical section (1, 11 21) tapering in a setting direction of the fastening element and having a shaped surface profile extending at least along a portion of the first section, and a second section (2, 12, 22) adjoining the first section (1, 11, 21) at end of the first section remote from the fastening element tip (5, 15, 25).

5 Claims, 2 Drawing Sheets

FASTENING ELEMENT

BACKGROUND OF THE INVENTION

1. Field of the Invention

The present invention relates to a nail-shaped fastening element having a first section and a second section adjoining the first section at its end remote from the tip of the fastening element.

2. Description of the Prior Art

U.S. Pat. No. 5,658,109 discloses a nail-shaped fastening element the cylindrical stem of which is partially provided with a shaped surface profile formed as a cross-shaped knurling. The shaped surface profile insures that upon setting of the fastening element in a constructional component, the material of the constructional component would fill the indentations of the profile, whereby a better connection of the fastening element with the constructional component is obtained.

An object of the present invention is the provide a nail-shaped fastening element that can be rapidly and reliably driven into a constructional component.

Another object of the present invention, is to provide a nail-shaped fastening element having a setting direction-side end region characterized by large holding forces, which insures a particularly good connection of the fastening element with the constructional component.

SUMMARY OF THE INVENTION

These and other objects of the present invention, which will become apparent hereinafter, are achieved by providing a nail-shaped fastening element having a first, conical section tapering in a setting direction of the fastening element and provided with a tip in form of a pointed end and a shaped surface profile extending at least along a portion of the first section, and a second section adjoining the first section at an end of the first section remote from the tip.

Providing the shaped surface profile on the first conical surface insures a particularly good connection of the fastening element with the constructional component. The present invention permits to achieve very high holding forces with the fastening element having a small length.

In order to obtain a good connection with the constructional component in the tip region, the shaped surface profile can extend from the tip at least along a portion of the first section.

Because during driving of a fastening element in a constructional component formed of a hard material, the tip is very strongly stressed mechanically, advantageously, the depth of the shaped surface profile is reduced toward the tip. Preferably, the shaped surface profile has a depth in the tip region that amounts from 01 mm to 2 mm, and in the opposite region that amounts from 0.05 mm to 0.8 mm. For manufacturing reasons, the shaped surface profile is formed as knurling. The knurling can be formed as a cross-shaped knurling and as a longitudinal knurling.

An increase of the holding force is achieved when the second section conically widens in the direction opposite the setting direction.

In order to provide for driving of the fastening element in the constructional component with as uniform drive energy as possible, advantageously, a smooth, stepless transition is provided from the first section to the second section.

In order to reliably secure a to-be-fastened object to a constructional component, there is provided a third section which is formed as a head and adjoins the second section. The third section can also be provided with a conical contour, with the cone angle of the third section exceeding that of the second section.

A large-surface support of the head section against the constructional component is insured when the third section projects radially beyond the second section. The largest radial extent of the head is achieved when the head is formed as a flange-shaped widening provided at the end of the third section remote from the second section.

The manufacturing of the fastening element is effected as follows. A blank is provided regionwise with a shaped surface profile, and at least the profiled region is heated. Then, the heated region is extended to form the tip. During the extension process, the cross-section of the first section is gradually reduced under a certain radius, with the depth of the profile diminishing toward the tip.

The novel features of the present invention, which are considered as characterstic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
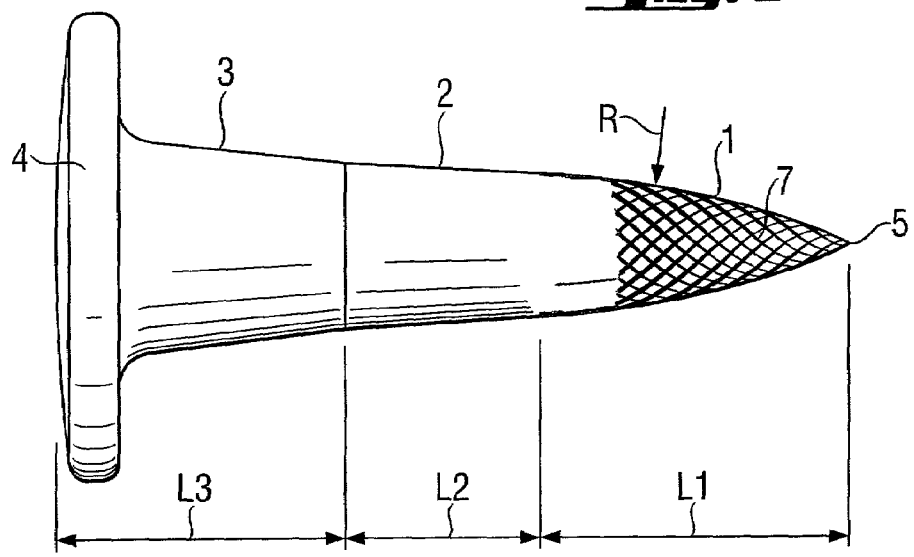
FIG. 1 shows a side view of a first embodiment of a fastening element according to the present invention and having its first section being provided with a shaped profile only partially.
Figure 2:
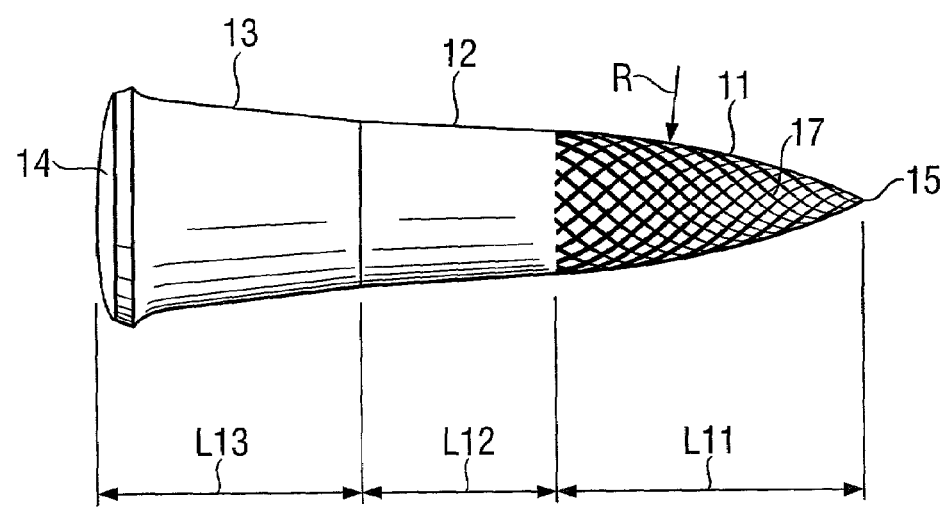
FIG. 2 shows a side view of a second embodiment of a fastening element according to the present invention and having its first section being provided with a shaped profile along its entire length.
Figure 3:
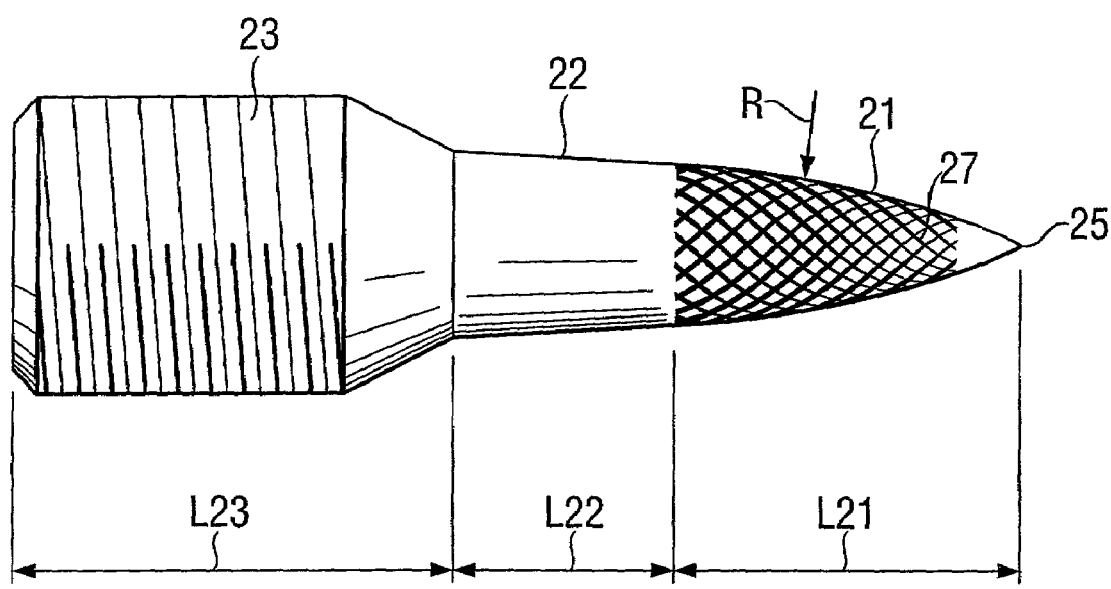
FIG. 3 shows a side view of a third embodiment of a fastening element according to the present invention and having its first section being provided with a shaped profile only partially.

A fastening element according to the present invention, which is shown in FIGS. 1–3, has a first section 1, 11, 21 which tapers toward a tip 5, 15, 25 formed as a pointed end, which faces in a setting direction of the fastening element under a radius R and which has a length L2, L12, L22. The first section 1, 11, 21 is adjoined, in a direction opposite the setting direction, by a second section 2, 12, 22 having a length L2, L12, L22. The second section 2, 12, 22 is adjoined, in the direction opposite the setting direction, by a head or a third section 3, 13, 23 having a length L3, L13, L23. The transition regions between the first and second sections and between the second and third sections are smooth, stepless transition regions.

The second sections 2, 12 and respective portions of the third sections 3, 13 of the fastening elements shown in FIGS. 1, 2 expand conically in the direction opposite the setting direction. The cone angle of the third section 3, 13 is larger than the cone angle of the second section 2, 12. The fastening elements shown in FIGS. 1 and 2 have each flange-shaped widening 4, 14 at the free end of the third section 3, 13. The flange-shaped widening 4 of the fastening element shown in FIG. 1 has an outer diameter that is substantially equal to a double of a diameter of the remaining portion of the third section 3. The flange-shaped widening 14 of the fastening element shown in FIG. 2 exceeds the diameter of the remaining portion of the third section 13 only by a small amount.

The second section 22 of the fastening element shown in FIG. 3 is formed as a substantially cylindrical section, and the third section 23 of this element is provided with an outer thread 28. In the fastening element of FIG. 3, the third section 23 has a radial dimension that noticeably exceeds that of the second section 22.

The first sections 1, 21 of the fastening elements shown in FIGS. 1, 3 are partially provided with shaped profile 7, 27, respectively. The shaped profile 7 of the fastening element of FIG. 1 extends from the tip 5 along a portion of the first section. The shaped profile 27 of the fastening element of FIG. 3 extends from a region of the first section 21, which is spaced from the tip 25, and to the end of the first section 11. In the fastening element of FIG. 2, a shaped profile 17 is provided along the entire length L11 of the first section 11.

The depth of the shaped profile 7, 17, 27 diminishes radially toward the tip 5, 15, 25. The depth of the shaped profile 17, e.g., amounts, in the transition region from the first section 11 to the second section 12, to about from 0.05 mm to 0.8 mm and amounts, in the region of the tip 15 to about from 0.01 mm to 0.2 mm. The shaped profile 7, 17, 27, e.g., can be formed by knurling.

Though the present invention was shown and described with references to the preferred embodiments such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments within the spirit and scope of the present invention as defined by the appended claims.

What is claimed is:

1. A nail-shaped fastening element, comprising a first, conical section (1, 11, 21) tapering in a setting direction of the fastening element and provided with a pointed end (5, 15, 25) and a knurled surface profile extending at least along a portion of the first section starting from the pointed end, and a second section (2, 12, 22) adjoining the first section (1, 11, 21) at an end of the first section remote from the pointed end (5, 15, 25), wherein a depth of the knurled surface profile (7, 17, 27) diminishes to the tip (5, 15, 25), and wherein the depth of the knurled surface profile (7, 17, 27) amounts from 0.01 mm to 0.2 mm at the pointed end (5, 15, 25) and amounts from 0.05 mm to 0.8 mm in an opposite end of the knurled surface profile (7, 17, 27).

2. A nail-shaped fastening element according to claim 1, wherein the second section (2, 12, 22) conically widens in a direction opposite the setting direction.

3. A nail-shaped fastening element according to claim 1, wherein a transition region from the first section (1, 12, 21) to the second section (2, 12, 27) is formed as a stepless transition region.

4. A nail-shaped fastening element according to claim 1, further comprising a third section (3, 13, 23) which is formed as a head and which adjoins the second section (2, 12, 22) at an end of the second section remote from the first section (1, 11, 21).

5. A nail-shaped fastening element according to claim 4, wherein at least one region of the third section (3, 12, 23) projects radially beyond an outer contour of the second section (2, 12, 22).

* * * * *